United States Patent
Cavenaugh et al.

(10) Patent No.: US 11,182,619 B2
(45) Date of Patent: Nov. 23, 2021

(54) POINT-OF-INTEREST DETERMINATION AND DISPLAY

(71) Applicant: LENOVO (Singapore) PTE. LTD., New Tech Park (SG)

(72) Inventors: Adam Jerome Cavenaugh, Cary, NC (US); David W. Douglas, Cary, NC (US); Kazuo Fujii, Yokohama (JP); Kenneth Seethaler, Raleigh, NC (US)

(73) Assignee: LENOVO (Singapore) PTE. LTD., New Tech Park (SG)

(*) Notice: Subject to any disclaimer, the term of this patent is extended or adjusted under 35 U.S.C. 154(b) by 44 days.

(21) Appl. No.: 16/742,538

(22) Filed: Jan. 14, 2020

(65) Prior Publication Data

US 2021/0216779 A1 Jul. 15, 2021

(51) Int. Cl.
*G06K 9/00* (2006.01)
*G06N 3/08* (2006.01)
*G06K 9/62* (2006.01)

(52) U.S. Cl.
CPC ....... *G06K 9/00744* (2013.01); *G06K 9/6256* (2013.01); *G06N 3/08* (2013.01); *G06K 2009/00738* (2013.01)

(58) Field of Classification Search
None
See application file for complete search history.

(56) References Cited

U.S. PATENT DOCUMENTS

| | | | | |
|---|---|---|---|---|
| 7,460,150 | B1 * | 12/2008 | Coughlan | H04N 7/147 348/169 |
| 2016/0283860 | A1 * | 9/2016 | Pycock | H04N 21/4788 |
| 2020/0169693 | A1 * | 5/2020 | Silveira | G06K 9/4628 |

* cited by examiner

*Primary Examiner* — Leon Flores
(74) *Attorney, Agent, or Firm* — Kunzler Bean & Adamson; Bruce R. Needham

(57) ABSTRACT

For point-of-interest determination and display, a processor detects an image event during a videoconference. The processor determines a point-of-interest for the video image of the videoconference based on the image event. The video image is at least a 180-degree image and the point-of-interest is a portion of the video image. The processor displays the point-of-interest from the video image on a display.

17 Claims, 7 Drawing Sheets

230b

| Scene Composition 237 | Classification 235 |
|---|---|
| Scene Composition 237 | Classification 235 |
| ⋮ | ⋮ |
| Scene Composition 237 | Classification 235 |

FIG. 2C

POINT-OF-INTEREST DETERMINATION AND DISPLAY

FIELD

The subject matter disclosed herein relates to determining and displaying a point-of-interest.

BACKGROUND

Images are displayed during video conferences.

BRIEF SUMMARY

An apparatus for point-of-interest determination and display is disclosed. The apparatus includes a display, a processor, and a memory that stores code executable by the processor. The processor detects an image event during a videoconference. The processor determines a point-of-interest for the video image of the videoconference based on the image event. The video image is at least a 180-degree image and the point-of-interest is a portion of the video image. The processor displays the point-of-interest from the video image on the display. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 2C is a schematic block diagram illustrating one alternate embodiment of a training data set;

DETAILED DESCRIPTION

Figure 1A:
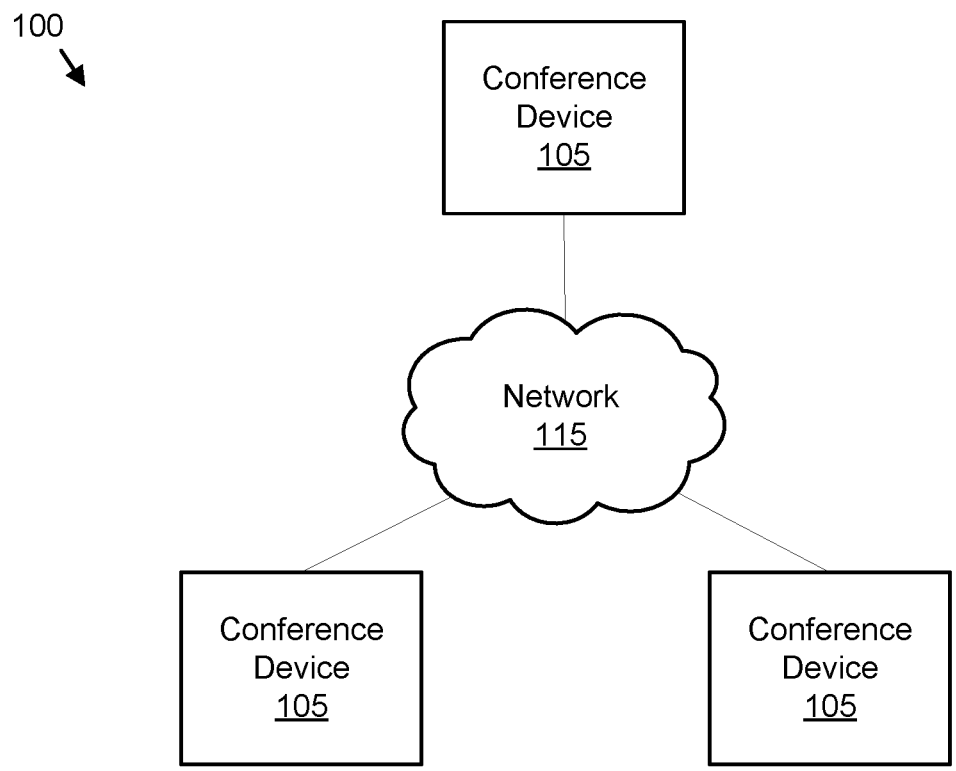
FIG. 1A is a schematic block diagram illustrating one embodiment of a video conference.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram illustrating one embodiment of a video conference 100. In the depicted embodiment, the video conference 100 includes a plurality of conference devices 105 in communication over a network 115. The network 115 may be the Internet, a mobile telephone network, a wide-area network, a local-area network, a Wi-Fi network, or combinations thereof. Participants that are co-located with each conference device 105 may communicate with other participants co-located with other conference devices 105.

A camera may capture the view at each location and transmit the view to displays in other locations. In order to capture all relevant activity, one or more cameras may capture a wide-angle view such as a 360-degree view. Unfortunately, as events transpire during the videoconference 100, important points of interest may be less noticeable in a wide-angle image. As a result, the videoconference experience is less personal for some participants. The embodiments detect an image event and determine a pointof-interest for a video image based on the image event. The embodiments display the point-of-interest, enhancing the videoconference 100 for participants and improving the efficiency of the conference devices 105 as will be described hereafter.

Figure 1B:
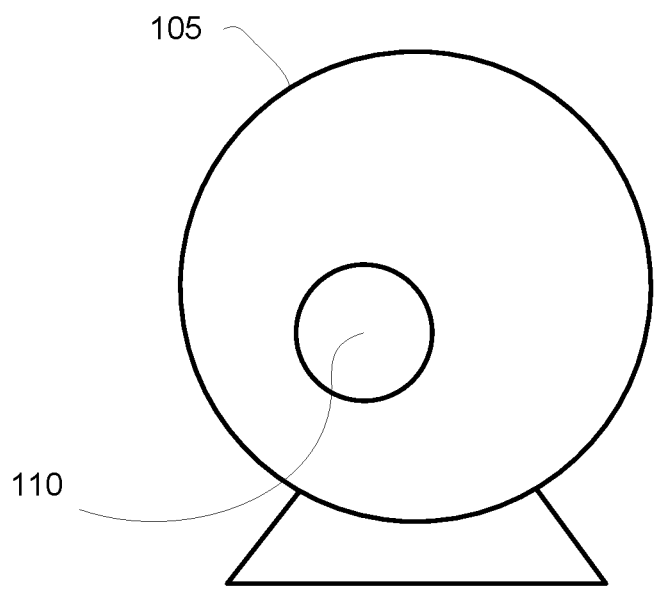
FIG. 1B is a drawing illustrating one embodiment of a conference device.

FIG. 1B is a drawing illustrating one embodiment of a conference device 105. In the depicted embodiment, the conference device 105 includes one or more cameras 110. In one embodiment, the cameras 110 capture a 360-degree video image. In a certain embodiment, the camera 110 captures at least a 180-degree video image. The camera 110 may capture a field-of-view in the range of 90-degrees to 360-degrees.

The conference device 105 may modify the video image presented to participants by modifying the field-of-view of the camera 110. In addition, the conference device 105 may modify the video image presented to participants by selecting a portion of the total image captured by the camera 110 as the video image.

Figure 2A:
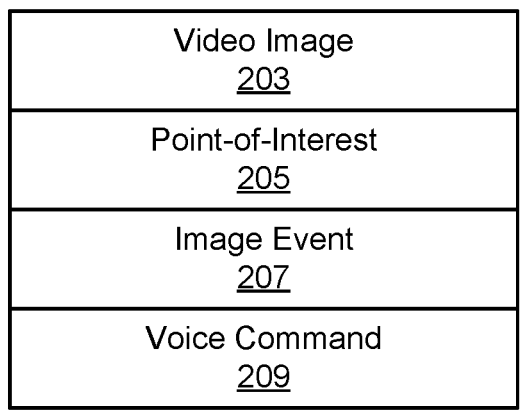
FIG. 2A is a schematic block diagram illustrating one embodiment of conference data.

FIG. 2A is a schematic block diagram illustrating one embodiment of conference data 200. The conference data 200 may be used to manage the detection of an image event 207 and determine a point-of-interest 205. The conference data 200 may be organized as a data structure in a memory. In the depicted embodiment, the conference data 200 includes the video image 203, the point-of-interest 205, the image event 207, and a voice command 209.

The video image 203 may be received from the one or more cameras 110. In one embodiment, the point-of-interest 205 is an area within the video image 203. The point-of-interest 205 may be parsed from the video image 203. In addition, the point-of-interest 205 may be all of the video image 203, with the field-of-view of the video image 203 and/or the point-of-interest 205 selected by the conference device 105.

In one embodiment, the video image 203 is at least a 180-degree image. The video image 203 may include a field-of-view in the range of 90-degrees to 360-degrees. For example, the video image 203 may cover an entire room, but the point-of-interest 205 may cover only a portion of the video image 203.

The image event 207 may be a movement by a speaker. In addition, the point-of-interest 205 may be the speaker. The image event 207 may comprise speech by a speaker. In addition, the point-of-interest 205 may be the speaker. In a certain embodiment, the image event 207 is a user interface input. The point-of-interest 205 may be determined from a user interface and/or the user interface input.

The voice command 209 may be received from a participant. The voice command 209 may specify an object selected from the group consisting of a name, a point-of-interest, and an action. The point-of-interest 205 may be the object of the voice command 209. For example, the object may be a physical model. A participant may speak the voice command 209 "view model" to position the point-of-interest 205 around the model.

Figure 2B:
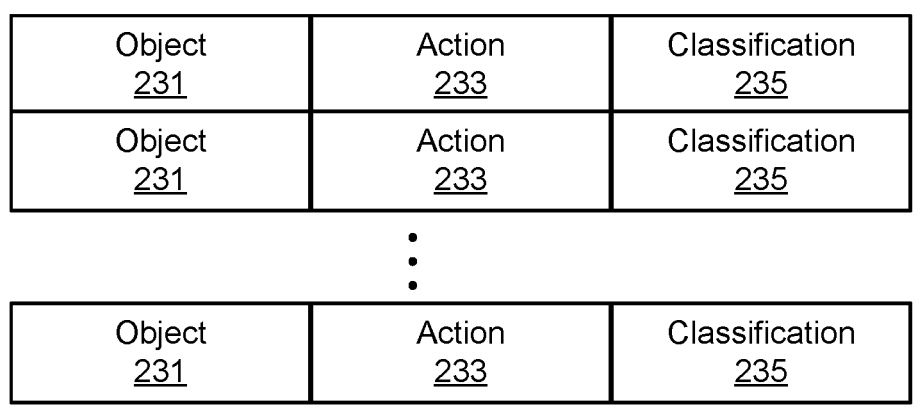
FIG. 2B is a schematic block diagram illustrating one embodiment of a training data set.

FIG. 2B is a schematic block diagram illustrating one embodiment of a training data set 230a. The training data set 230a may be used to train the neural network. The training data set 230a may be organized as a data structure in a memory. In the depicted embodiment, the training data set 230a includes a plurality of entries, and each entry may include an object 231, an action 233, and/or a classification 235.

The object 231 may be an image of an object that is viewable during a videoconference 100. For example, the object 231 may depict a white board, a person, a model, a document, and the like. In one embodiment, the object 231 is an image of a person that participates in videoconferences 100.

The action 233 may be an image and/or image sequence of a participant performing an action. For example, the action 233 may depict a participant moving to a whiteboard, a participant speaking, a participant holding up a document, and the like.

The classification 235 classifies the object 231 and/or action 233. For example, the classification 235 for a participant object 231 may be "Bob" while the classification 235 for a whiteboard object 231 may be "whiteboard." In addition, the classification 235 for a participant speaking may be "speaking."

In one embodiment, the classifications 235 specifies whether the video image 203 includes an image event 207. For example, the classification 235 "speaking" may also indicate that the detected action 233 is an image event 207. Similarly, the classification 235 may indicate that the detected action 233 of "drinking" is not an image event 207.

FIG. 2C is a schematic block diagram illustrating one alternate embodiment of a training data set 230b. The training data set 230b may be used to train the neural network. The training data set 230b may be organized as a data structure in a memory. In the depicted embodiment, the training data set 230b includes the classification 235 and a scene composition 237.

In one embodiment, the scene composition 237 includes images of objects 231 and/or participants in a point-of-interest 205. In addition, the scene composition 237 may include images and/or image sequences of objects 231 and/or participants performing actions 233. The classification 235 classifies the scene composition 237.

In one embodiment, the scene composition 237 is used to determine the classification 235. For example, a scene composition 237 comprising a plurality of participants looking at a model may have an "observe object" classification 235, with the classification 235 identified as an image event 207. Similarly, a scene composition 237 comprising a plurality of participants standing may have a "break" classification 235, with the classification 235 identified as not an image event 207.

In one embodiment, the classification 235 is used to determine the scene composition 237, and the scene composition 237 determines the point-of-interest 205. For example, if the classification 235 is the "observe object" classification 235, the scene composition 237 may specify the point-of-interest 205 for the classification 235 by identifying an arrangement of participants and objects in the point-of-interest 205.

Figure 3A:
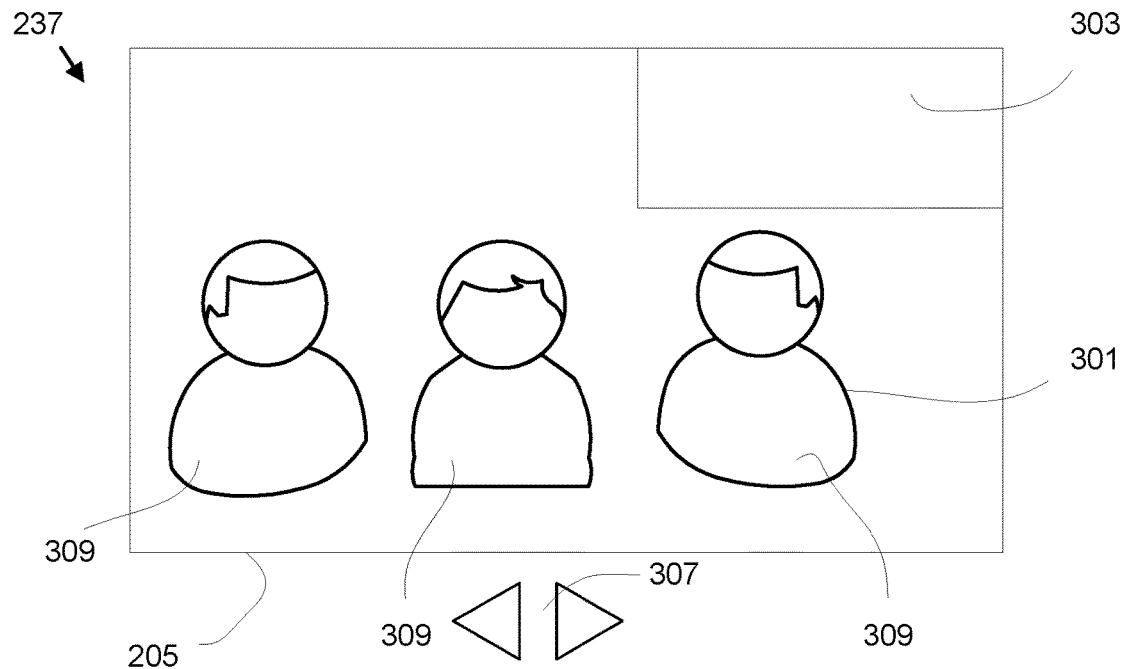
FIG. 3A is a drawing illustrating one embodiment of a point-of-interest.

FIG. 3A is a drawing illustrating one embodiment of a point-of-interest 205. The point-of-interest 205 may be parsed from the video image 203 captured by the camera 110 of the conference device 105. In the depicted embodiment, the point-of-interest 205 includes a scene composition 237 with three participants 309 including a speaker 301, and a whiteboard 303.

In one embodiment, the point-of-interest 205 is selected in response to identifying a scene composition 237 that includes each participant 309. The scene composition 237 may have an "all participants" classification 235. As a result, the point-of-interest 205 may be determined to include each participant 309. In one embodiment, the "all participants" classification 235 is a default classification 235 if no image events 207 are detected.

A user interface 307 is also shown. The user interface 307 may generate a user interface input. In one embodiment, selecting an arrow of the user interface 307 may modify the point-of-interest 205.

Figure 3B:
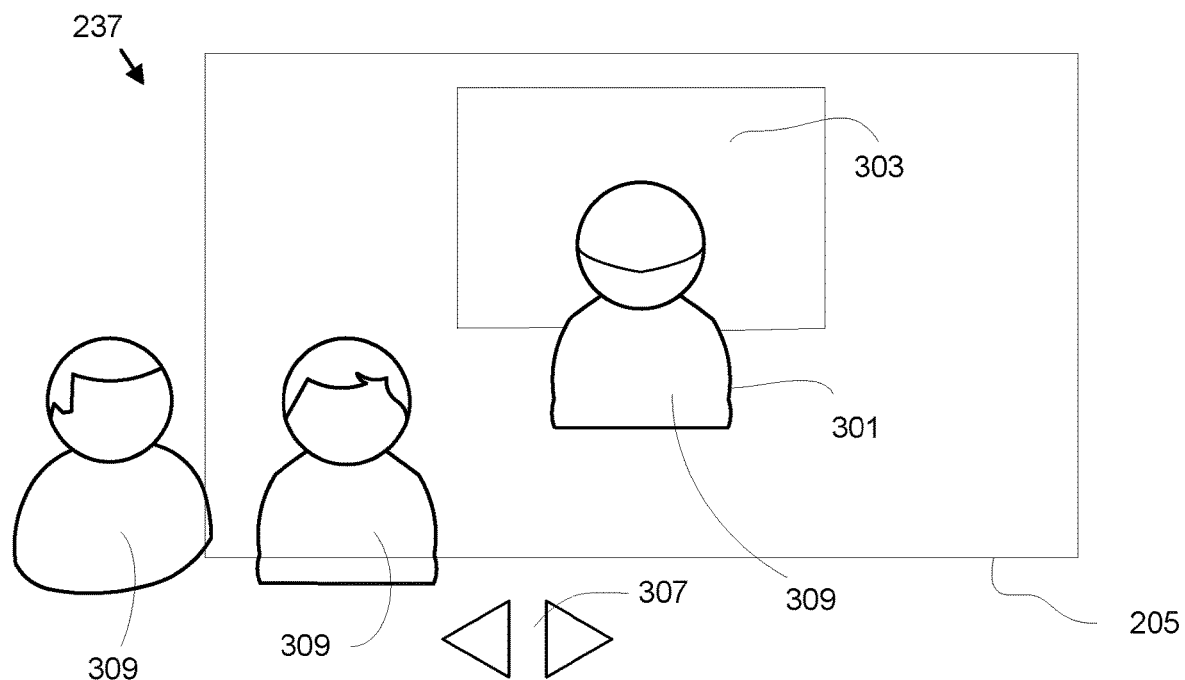
FIG. 3B is a drawing illustrating one alternate embodiment of a point-of-interest.

FIG. 3B is a drawing illustrating one alternate embodiment of the point-of-interest 205. In the depicted embodiment, the action 233 of "moving to the whiteboard" is identified. The classification 235 of "whiteboard" may be associated with the action 233 of "moving to the whiteboard." The point-of-interest 205 may be determined to be the speaker 301 and/or participant 309 at the whiteboard 303 based on the scene composition 237 associated with the "whiteboard" classification 235.

Figure 4A:
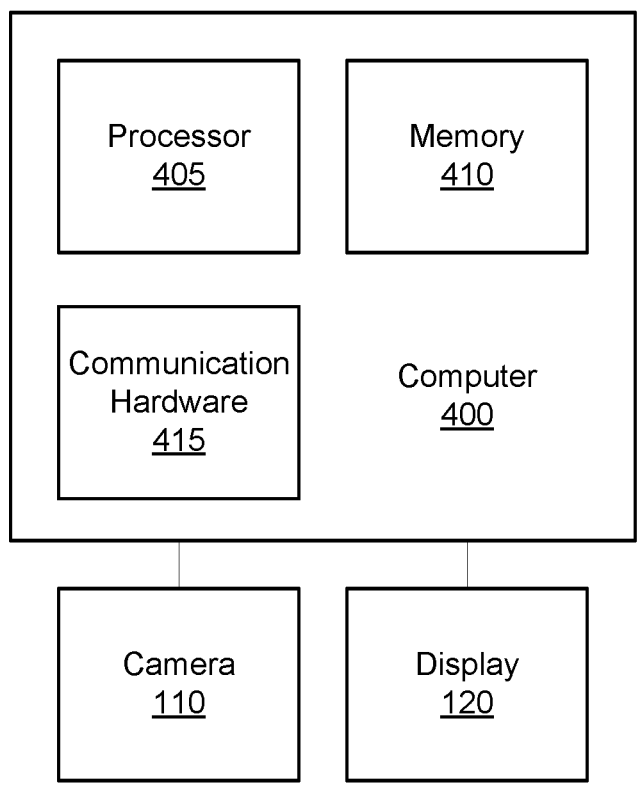
FIG. 4A is a schematic block diagram illustrating one embodiment of a computer.

FIG. 4A is a schematic block diagram illustrating one embodiment of a computer 400. The computer 400 may be embodied in each conference device 105. In addition, the computer 400 may be embodied in a server. In the depicted embodiment, the computer 400 includes a processor 405, a memory 410, and communication hardware 415. The memory 410 may comprise a semiconductor storage device, hard disk drive, or combinations thereof. The memory 410 may store code. The processor 405 may execute the code. The communication hardware 415 may communicate with other devices such as the cameras 110 and/or display 120. The display 120 may display the point-of-interest 205.

Figure 4B:
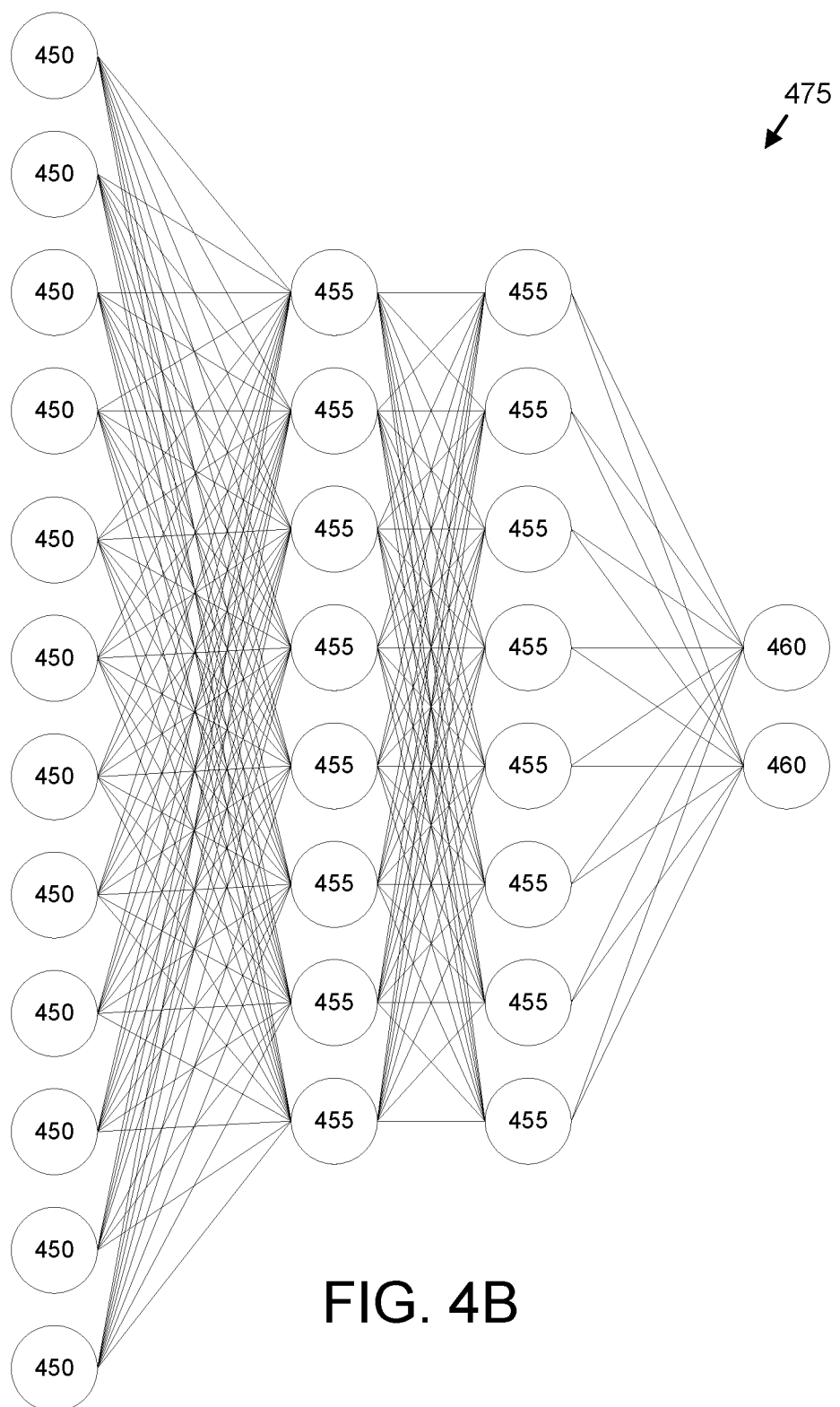
FIG. 4B is a schematic diagram illustrating one embodiment of a neural network.

FIG. 4B is a schematic block diagram illustrating one embodiment of a neural network 475. In the depicted embodiment, the neural network 475 includes input neurons 450, hidden neurons 455, and output neurons 460. The neural network 475 may be organized as a convolutional neural network, a recurrent neural network, long short-term memory network, and the like.

The neural network 475 may be trained with a training data set 230. The neural network 475 may be trained using one or more learning functions while applying the training data set 230 to the input neurons 450 and known result values for the output neurons 460. Alternatively, the neural network 475 may be trained unsupervised. Subsequently, the neural network 475 may receive actual data at the input neurons 450 and make predictions at the output neurons 460 based on the actual data.

For example, the neural network 475 may be trained by presenting objects 231 and/or actions 233 to the input neurons 450 with the classification 235 as the known result. Subsequently, the video image 203 may be presented to the input neurons 450 and the output neurons 460 may predict the classification 235.

In an alternative example, the neural network 475 may be trained by presenting a scene composition 237 to the input neurons 450 with the classification 235 as a known result. Subsequently, a scene composition 237 may be determined from the video image 203 and presented to the input neurons 450. The output neurons 460 may predict the classification 235.

In one embodiment, the neural network 475 may be trained by presenting a classification 235 to the input neurons 450 with the scene composition 237 as a known value. Subsequently, a classification 235 may be presented to the input neurons 250 and a scene composition 237 generated at the output neurons 460.

Figure 5:
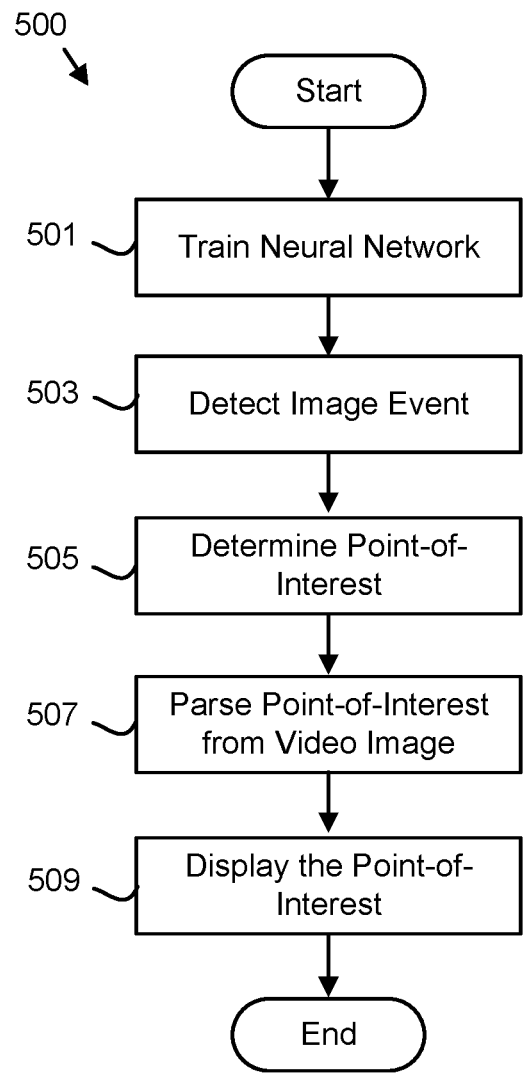
FIG. 5 is a schematic flow chart diagram illustrating one embodiment of a point-of-interest display method.

FIG. 5 is a schematic flow chart diagram illustrating one embodiment of a point-of-interest display method 500. The method 500 may determine a point-of-interest 205 and display the point-of-interest 205. The method 500 may be performed by the video conference 100, the computer 400, and/or a processor 405 of the computer 400.

The method 500 starts, and in one embodiment, the processor 405 trains 501 the neural network 475. The neural network 475 is trained with the training data set 230. The training data set 230a may comprise objects 231, actions 233, and/or classifications 235. In addition, the training data set 230b may comprise classifications 235 and scene compositions 237. The neural network 475 may be trained 501 as described in FIG. 4B.

The processor 405 detects 503 an image event 207 during the video conference 100. The image event 207 may be detected 503 using the neural network 475 trained on the training data set 230. In addition, the image event 207 may be detected 503 by an algorithm executing on the processor 405.

In one embodiment, the processor 405 presents the video image 203 to the neural network 475. The neural network 475 may predict the classification 235 for the video image 203 and whether the video image 203 includes an image event 207. The movement of the speaker 301/participant 309 to the whiteboard 303 shown in FIG. 3B may result in the classification 235 that the action 233 is the image event 207 with the classification 235 of "moving to whiteboard."

In one embodiment, the image event 207 comprises a movement by the speaker 301. In addition, the image event 207 may comprise speech by the speaker 301. In a certain embodiment, the image event 207 comprises the voice command 209. In addition, the image event 207 may be a user interface input from the user interface 307.

The processor 405 may determine 505 the point-of-interest 205 for the video image 203 of the videoconference 100 based on the image event 207. The point-of-interest 205 may be a portion of the video image 203. For example, if the image event 207 is a movement by the speaker 301, the point-of-interest 205 may be the speaker 301. In a certain embodiment, the point-of-interest 205 is centered about the head of the speaker 301.

In one embodiment, if the image event 207 is speech by the speaker 301, the processor 405 may determine 503 the point-of-interest 205 to be the speaker 301. Alternatively, if the image event 207 is a voice command 209 that specifies viewing a model object 231, the processor 405 may determine 503 the point-of-interest 205 to be the model object 231.

In a certain embodiment, if the image event 207 is the user interface input from the user interface 307, the point-of-interest 205 may be determined 503 to be the portion of the video image 203 specified by the user interface input. For example, a participant may enter a pan left user interface input, and the point-of-interest 205 may be moved to the left.

The processor 405 may parse 507 the point-of-interest 205 from the video image 203. In one embodiment, the point-of-interest 205 includes the heads and/or upper bodies of speakers 301 and/or participants 309 performing actions 233.

The processor 405 further displays 509 the point-of-interest 205 from the video image 203 and the method 500 ends. The point-of-interest 205 may be displayed 509 on the display 120.

The embodiments detect the image event 207 during the videoconference 100. The embodiments further determine a point-of-interest 205 for the video image 203 based on the image event 207. The point-of-interest 205 is displayed, enhancing the video conference 100 for the participants 309 as the principal action or object of the video conference is prominent and easy to view. As a result, the efficiency and effectiveness of the conference devices 105 and/or computer 400 are enhanced.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a display;
a processor;
a memory that stores code executable by the processor to:
detect an image event during a video conference;
determine a point-of-interest for a video image of the video conference based on the image event, wherein the video image is at least a 180-degree image the point-of-interest is a portion of the video image and is determined using a neural network trained on a training data set comprising scene compositions and classifications, the scene compositions comprising images of objects and participants performing actions, the actions comprising looking at an object, standing, and/or being in an arrangement, and the classifications classifying the objects and/or actions; and
display the point-of-interest from the video image on the display.

2. The apparatus of claim 1, wherein the point-of-interest is parsed from the video image.

3. The apparatus of claim 1, wherein the training data set further comprises objects and actions.

4. The apparatus of claim 1, wherein the image event comprises a movement by a speaker and the point-of-interest is the speaker.

5. The apparatus of claim 1, wherein the image event comprises speech by a speaker and the point-of-interest is the speaker.

6. The apparatus of claim 1, wherein the image event comprises a voice command that specifies an object selected from the group consisting of a name, a point-of-interest, and an action and the point-of-interest is the object.

7. The apparatus of claim 1, wherein the image event is a user interface input from a user interface and the point-of-interest is determined from the user interface input.

8. A method comprising:
detecting, by use of a processor, an image event during a video conference;
determining a point-of-interest for a video image of the video conference based on the image event, wherein the video image is at least a 180-degree image, the point-of-interest is a portion of the video and is determined using a neural network trained on a training data set comprising scene compositions and classifications, the scene compositions comprising images of objects and participants performing actions, the actions comprising looking at an object, standing, and/or being in an arrangement, and the classifications classifying the objects and/or actions; and
displaying the point-of-interest from the video image.

9. The method of claim 8, wherein the point-of-interest is parsed from the video image.

10. The method of claim 8, wherein the training data set further comprises objects and actions.

11. The method of claim 8, wherein the image event comprises a movement by a speaker and the point-of-interest is the speaker.

12. The method of claim 8, wherein the image event comprises speech by a speaker and the point-of-interest is the speaker.

13. The method of claim 8, wherein the image event comprises a voice command that specifies an object selected from the group consisting of a name, a point-of-interest, and an action and the point-of-interest is the object.

14. The method of claim 8, wherein the image event is a user interface input from a user interface and the point-of-interest is determined from the user interface input.

15. A program product comprising a non-volatile computer readable storage medium that stores code executable by a processor, the executable code comprising code to:
detect an image event during a video conference;
determine a point-of-interest for a video image of the video conference based on the image event, wherein the video image is a 180-degree image, the point-of-interest is a portion of the video image and is determined using a neural network trained on a training data set comprising scene compositions and classifications, the scene compositions comprising images of objects and participants performing actions, the actions comprising looking at an object, standing, and/or being in an arrangement, and the classifications classifying the objects and/or actions; and
display the point-of-interest from the video image.

16. The program product of claim 15, wherein the point-of-interest is parsed from the video image.

17. The program product of claim 15, wherein the training data set further comprises objects and actions.

* * * * *